United States Patent Office 3,560,441
Patented Feb. 2, 1971

3,560,441
ANTIMONY TRIOXIDE INORGANIC COMPOUND GLASS FLAME RETARDANT COMPOSITIONS AND METHODS FOR THEIR PREPARATION
Morton Schwarcz, Watchung, Angelo Charles Cocuzza, Edison, and Roland Reed Van Der Beck, Somerville, N.J., assignors to M & T Chemicals Inc., New York, N.Y., a corporation of Delaware
No Drawing. Filed Dec. 16, 1968, Ser. No. 784,192
Int. Cl. C09k 3/28
U.S. Cl. 260—45.75
45 Claims

ABSTRACT OF THE DISCLOSURE

Flame retardant compositions are provided and methods for their preparation for imparting flame retardancy to various resin compositions including halogenated polyolefins, polyolefins in combination with a halogen source such as polyethylene and polypropylene, polyesters, synthetic fibers, polyvinyl chloride and copolymers thereof, other polymers and halogenated polymers, with the flame retardancy of said resins being achieved in conjunction with a much higher degree of transparency to the vinyl resin compositions when transparent resin compositions are desired, and a much higher degree of true color by reducing interference between light and pigment when colored resin compositions are desired. The above is achieved by lowering the refractive index of an antimony trioxide flame retardant to more nearly coincide with a resin composition into which it may be introduced by forming an admixture of antimony trioxide with an inorganic salt in the ratio of 10:90 to 99:1, heating the admixture to a temperature of between about 650° C. and 1100° C. for a period of time sufficient to melt, rapidly cooling the melt to form glass, reducing the formed glass to a particle size within the range of 60 microns or less, and introducing the ground glass composition into the resin composition to impart thereto flame retardancy while maintaining low opacity. Further, resin compositions containing the flame retardant compositions are provided and their method of preparation.

FLAME RETARDANT COMPOSITIONS AND METHODS FOR THEIR PREPARATION

Generally speaking, this invention relates to flame retardant compositions and the method for their preparation for introduction into various resin compositions such as, for example, polyolefins in combination with halogenated organics, such as polypropylene and polyethylene; synthetic fibers and polyesters in combination with a halogen source; halogenated polyolefins; plastisols; polyvinyl chloride, copolymers containing polyvinyl chloride; and other polymers and halogenated polymers. More particularly, this invention relates to compositions for imparting flame retardancy to resins as noted above substantially without any increase in opacity to the final resin compositions into which the flame retardant compositions are introduced.

With the ever increasing use of plastics in all phases of our economy, there is a corresponding concern with regard to their use in conjunction with fire prevention. Plastics involving the utilization of antimony trioxide as a flame retardant are well known and form the subject matter of a large variety of industrial processes and applications. However, as is well known, variation in particle size as well as impurities of the antimony trioxide compositions for introduction into various resins may vary the final product in the sense that different flame retardancy characteristics are achieved, different degrees of smoke inhibition are correspondingly achieved, and further, undesirable fluctuation in opacity from batch to batch may result.

As will be understood, resins of the type discussed herein have a tendency toward a high degree of instability in the presence of heat and light, and therefore, although they possess many favorable characteristics for application in a wide variety of applications, their tendency toward degradation in the presence of heat and light, and more importantly, their reaction to the presence of flame inhibits their use in many applications. Therefore, there have been many developments toward enhancing their flame retardancy and correspondingly to impart low smoke characteristics to the final resin product.

As is well understood, the use of antimony trioxide compositions has proved highly satisfactory for the purposes of imparting flame retardancy and low smoke characteristics to such resin compositions without, in turn, interfering with the stability of the resins in the applications to which they have been applied or during their preparation. However, one problem has arisen with such applications in that the antimony trioxide flame retardants have a tendency to impart opacity to such resin compositions. Because of this, whereas the antimony trioxide compositions have proved effective for imparting flame retardancy, they have proved inappropriate in some circumstances for those applications where it is desired to have the final product in transparent form.

It has been found, for example, that the antimony trioxide compositions possess certain properties which impart opacity to the plastics. Further, variations in particle size in such a composition have been found to impart different degrees of opacity to different batches of the same composition, thus imparting different degrees of opacity (and the converse, different degrees of transparency), where the same degree is desired for producing a large quantity of the same transparent product.

In addition, because of this variation in opacity with the final resin product, if color is being used, the increased opacity, or the variation in opacity interferes with the true color of the pigments dispersed within the resin compositions, thus creating the problem where certain batches of the product will have different degrees of the same color from other batches thus producing the undesirable situation in which a large quantity of the same product in which the same color is desired may have actual differences in color, even to the extent where it appears that some of the color pigments are faded. Further, such prior art antimony trioxide formulations may even have an undesirable effect on the actual dispersed color pigment thus interfering with the true color desired.

Attempts have been made to overcome this problem by the utilization of liquid phosphorous compounds. Whereas such applications have been effective for the purpose of reducing the opacity of the final resin compositions, they may also have the deleterious effect of reducing the desired level of stability of the plastic in the first place for whatever application to which it is to be applied. In addition, such compounds are very expensive, and when one realizes that resins as discussed herein may be applied to extremely large mass production operations in which literally thousands of the same products may be produced such compounds become economically prohibitive. The same thing can be said of the use of triphenyl antimony for the same purposes.

Thus, the problem arises where in order to impart effective flame retardancy and low smoke attributes to the particular useful resins as described herein reduces their effectiveness in certain applications where transparent resins and/or resins of true, a non-variable color are desired, and conversely, where the desired transparency or lack of opaque characteristics in the particular resin are achieved, the use of the latter are prohibited merely by the expense involved in achieving them by the use of such compounds as liquid phosphorous compounds and triphenyl antimony. Further, such latter compounds may reduce the stability of such resins for certain applications.

By contrast, and quite unexpectedly, it has now been found in accordance with this invention that combining antimony trioxide with various inorganic salts and in various ratios and heating to a particular temperature range so as to melt the combined ingredients into a viscous liquid, which in turn is rapidly cooled under certain operating conditions, a glass substance is formed. The latter is, in turn, reduced to a particular particle size with the reduced composition being in turn dispersed in the particular desired resin composition. Such an arrangement imparts to the resin composition a high degree of flame retardancy, a low smoke characteristic, without imparting at the same time, any increased opacity to the resin composition in the first place and/or any deleterious effect on pigment which may be dispersed therein. It has been found, in accordance herewith, that such flame retardant compositions have a lowered refractive index, as opposed to antimony trioxide alone, which more nearly approximates the refractive index of the resin composition into which it is introduced.

Accordingly, it is one object of this invention to produce flame retardants for resins as described herein which compositions are selected to have an effective refractive index substantially within the same range as the refractive index of the particular resin composition for which the flame retardant composition is to be used. In addition, it is another object of this invention to produce such flame retardant compositions which produce effective flame retardancy in conjunction with effectively low smoke levels.

It is a further object of this invention to produce such high flame retardant compositions which achieve effective flame retardancy while at the same time not having any deleterious effect upon the stability of the particular resin compositions discussed herein or in the formulation thereof. A further object of this invention is to produce such flame retardant-low smoke compositions which effectively prevent any increase in opacity of the final resin compositions noted herein thus being particularly effective for producing transparent resin compositions, and effectively avoiding any interference with the pigments dispersed in colored resin compositions to produce the true desired color effect, and in turn, to eliminate any color variation between batches of such resin compositions.

In addition, it is an object of this invention to produce stable effective flame-retardant resin compositions, in accordance herewith, in which the flame retardant dispersed therein is selected to have substantially the same refractive index as the resin itself thereby effectively avoiding any increase in the opacity thereof.

With the foregoing and additonal objects in view, this invention will be described in more detail and other objects and advantages will be apparent from the following description and the appended claims.

Before describing this invention in more detail, it may be well to note that this invention has been found applicable to a wide variety of resins, such as halogenated polyolefins, polyvinyl chloride and copolymers containing polyvinyl chloride, and generally other polymers and polymers in combination with a halogen source. For example, satisfactory results have been achieved in accordance herewith, and under satisfactorily and economically attractive conditions on commercial scale operations with flame retardant-low smoke compositions by pre-selecting a particular refractive index as desired depending upon the refractive index of the resin into which it is to be introduced and by changing the refractive index of antimony trioxide accordingly by admixing antimony trioxide with an inorganic salt in the ratio of 10:90 to 99:1, heating the admixture to a temperature of between 650° C. and 1100° C. for a period of time sufficient to melt, rapidly cooling the melt to form glass, reducing the formed glass to a particle size within the range of less than about 60 microns, and introducing the reduced composition into the particular resin composition to be flame retarded to impart thereto flame retardancy while maintaining low opacity.

In considering generally the conditions for achieving the most enhanced results in connection herewith, which conditions are more specifically set forth below, one may note that satisfactory flame retarded-low smoke retarded resin compositions are realized by introducing into the particular desired resin composition an amount of the particular flame retardant-low smoke composition of substantially the same amount of a standard antimony trioxide formulation which would be introduced for the same purpose, while in some cases amounts of ⅓ to ½ more may be appropriate.

Whereas a larger portion of the particular flame retardant compositions of this invention may be used in some cases for producing the desired flame retardancy-low smoke characteristics, the additional advantage of high transparency-low opacity is also achieved as noted above. In addition, since the compositions in accordance herewith have a lower percentage of antimony trioxide therein on a weight for weight basis than would be the case if pure antimony trioxide were being introduced there is a substantial reduction in cost, simply because the additional inorganic salt used in accordance herewith costs substantially less than antimony trioxide itself.

A preferred cycle of operation in accordance herewith for formulating the particular flame retardant-low smoke composition includes admixing antimony trioxide and an inorganic salt, preferably sodium borate or sodium aluminum fluoride, preferably in the ratio of 10:90 to 99:1 antimony trioxide:salt, with the most preferred ratio being 80:20 $Sb_2O_3$:salt. The admixture is heated, preferably in the presence of an oxidizing atmosphere, to a temperature sufficient to fuse the combined ingredients of the admixture, with the range of temperature being between about 650° C. and 1100° C., and preferably 1000° C. In this connection, the temperatures are those which give fusion relatively quickly. In some instances, however, it may be possible to obtain fusion at substantially lower temperatures, simply because antimony oxide melts at 656° C., $Na_2B_4O_7$ at 741° C., and $Na_3AlF_6$ at 1000° C. The interreaction of these materials, or of antimony oxide with either of the other two tend to produce fusions at much lower temperatures, especially at or near eutectic composition. A temperature of about 1000° C. will provide relatively rapid fusion without the necessity of evaluating specific interrelationships. The formed melt is then poured onto a cold, non-corrosive metallic surface and preferably steel or aluminum and allowed to cool to room temperature. The fused glass-like material is then crushed and pulverized.

In this connection, the fused product may be reduced in a Hammermill and pulverized in a mechanical mortar and pestle. In actual commercial production, the grinding will preferably take place in a Jet mill since the abrasion index of the product melt may be too severe for a Hammermill. The fused product is reduced and pulverized to a particle size of less than about 60 microns, and preferably to a size which will pass through a 325 mesh sieve (U.S. Standard). The preferred particle size range is less than 1 to 5 microns.

An alternative procedure for formulation of the particles may include pouring the melt into water, thus forming glass of coarse particle size and then further reducing to the desired particle size. The latter two procedures may be appropriate in those instances where standard reducing procedures may prove economically prohibitive.

In selecting particle size, it has been found, in accordance herewith, that smaller particles increase the flame retardancy characteristics in direct proportion to their size and with little or no variation in the refractive index thereof.

As noted above, the results achieved in accordance herewith effectively change the refractive index of the flame retardant-low smoke composition to be generally in the order of the refractive index of the particular resin into which it is to be introduced. However, the general characteristics of one of the preferred compositions; that is, antimony trioxide-sodium borate, having a ratio by weight of 80:20 possesses a low water solubility with less than 0.2% Na extractable, and 0.009% Sb extractable. The pH is 9.0 (10% by weight in water), with the refractive index being substantially about 1.75.

As noted above, the ratio of antimony trioxide and inorganic salt may vary to some extent within the particular ranges noted above in order to obtain a particular desired refractive index depending upon the particular resin being flame retarded. It has been found, in accordance herewith, that satisfactory results are achieved utilizing, but not limited to, one or more borates in various formulations and ratios with antimony trioxide, and including sodium borate, lithium borate, zinc borate, and ammonium borate. Other inorganic salts which have provided satisfactory results in accordance herewith include potassium orthophosphite, sodium phosphate, sodium fluorophosphate, lead oxide, sodium alluminate, sodium aluminum fluoride, boric anhydride, phosphorous pentoxide, sodium pyrophosphate, barium oxide, sodium carbonate, cobaltous carbonate, calcium oxide, magnesium carbonate, and sodium antimonate and mixtures thereof.

As noted above, various antimony trioxide-inorganic salt compositions may be formulated in accordance herewith utilizing a wide variety of ratios of antimony trioxide-inorganic salt. Examples of various formulations of antimony trioxide glass systems which have proved effective, in accordance herewith, are listed in Table I, below.

phasized here, however, that whichever ratio is chosen, the flame retardant compositions achieved in accordance herewith have substantially reduced refractive indexes which substantially decrease the opaque characteristic of the final resin compositions.

As noted above, the flame retardant compositions, in accordance herewith, are particularly appropriate for dispersion in such synthetic resin compositions as polyolefins, such as polypropylene and polyethylene, and for polyvinyl chloride, and copolymers thereof, polyvinyl chloride plastisols, synthetic fibers, as well as other polymers, and polymers in combination with a halogen source. As purely illustrative of the high flame retardant-low smoke results achieved, in accordance herewith, a plurality of polyvinyl chloride specimens were prepared with each containing the same ingredients and portions of ingredients, while some of the specimens contained flame retardant compositions in accordance herewith while other specimens contained standard antimony trioxide flame retardant compositions. More specifically, the specimens contained 100 parts (by weight) polyvinyl chloride, 40 parts di-octyl phthalate, 5 parts epoxidized soybean oil as a plasticizer-stabilizer, 3 parts of a barium-cadmium heat stabilizer, as well known, and from 2–6 parts of a flame retardant composition. The ingredients were premixed and milled on a 2-roll mill at 190° C. for 5 minutes with the mill opening sufficient to give a sheet 25 mils thick for flame retardancy tests according to ASTM 1433–58. Six 3″ x 9″ specimens were used to obtain flame spread data and smoke generation.

The results of the examples may be noted in Table II below in which the levels required to obtain good flame retardancy are shown with corresponding smoke generation measurements and with the control sample of flame retardant composition being Thermoguard S, a product of M&T Chemicals Inc., and being a standard antimony trioxide flame retardant containing 99.5% antimony tri-

TABLE I

| Reactants, percent | Temperature | Color and comments |
|---|---|---|
| (1) $NaB_4O_7$, 15; $Sb_2O_3$, 85 | 950 | Dark yellow. |
| (2) $Na_2B_4O_3$, 90; $Sb_2O_3$, 10 | 1,000 | Clear glass slight color. |
| (3) $Na_2B_4O_7$, 50; $Sb_2O_3(w)$, 50 | 1,000 | Light yellow and clear. |
| (4) $NaAlO_2$, 15; $Sb_2O_3$, 85 | 950 | Slight haze and yellow. |
| (5) $B_2O_3$, 30; $Sb_2O_3$, 70 | 1,000 | Poured into $H_2O$, solids are dull glass. |
| (6) $B_2O_3$, 10; $P_2O_5$, 10; $Sb_2O_3$, 80 | 1,030 | Clear transparent melt, high yellow color. |
| (7) $NaHCO_3$, 15; $P_2O_5$, 15; $Sb_2O_3$, 70 | 1,050 | Clear melt, 70 $Sb_2O_3$30$Na_2B_4O_7$. |
| (8) $NaHCO_3$, 15; $P_2O_5$, 15; $Sb_2O_3$, 70; $CoCO_3$, 1 | 1,050 | Transparent dark blue. |
| (9) $NaHCO_3$, 15; $P_2O_5$, 15; $Sb_2O_3$ 70; $CoCO_3$, 005 | 1,050 | Light green transparent. |
| (10) $NaHCO_3$, 10; $P_2O_5$, 10; $Sb_2O_3$, 80 | 1,100 | Transparent dark yellow. |
| (11) $Sb_2O_3(w)$, 50; $Na_2B_4O_7$, 50 | 1,050 | Light yellow transparent. |
| (12) $Sb_2O_3(w)$, 60; $Na_2B_4O_7$, 40 | 1,100 | Do. |
| (13) $Sb_2O_3$, 70; $Na_2B_4O_7$, 30 | 1,100 | Light color yellow clear. |
| (14) $KOH+B_2O_3$, 20; $Sb_2O_3$, 80 | 1,100 | Yellw glass clear. |
| (15) $LiB_4O_7$, 20; $Sb_2O_3$, 80 | 1,100 | Yellow and clear. |
| (16) $ZnB_4O_7$, 20; $Sb_2O_3$, 80 | 1,100 | Slight yellow and clear. |
| (17) $NH_4HB_4O_7$, 20; $SB_2O_3$, 80 | 1,100 | Yellow color clear. |

As noted above, variations in the ratio of antimony trioxide to inorganic salt may be made in accordance with the most appropriate conditions regarding the particular resin into which the flame retardant composition is to be introduced, and variations may occur depending upon which formulation of antimony trioxide and inorganic salt is to be used. In addition, variations in the ranges may be made depending upon the final results which are desired, particularly with reference to transparency and flame retardancy. For example, if it is desired to have a final product with a particularly high degree of transparency, and/or a particularly high degree of color accuracy is desired, then a ratio within the range is selected in which a higher percentage of the inorganic salt is included. If, on the other hand, flame retardancy (and/or low or no smoke characteristic) is the most important factor when considering the final product to be made from the particular resin composition noted herein, then a higher percentage of antimony trioxide within the particular ranges noted will be selected. It should be emoxide and with the particle size thereof being substantially within the range of 1 micron. It is to be understood, however, that these examples are being presented with the understanding that they are to have no limiting character on the broad disclosure of the invention as generally set forth herein and as directed to men skilled in the art.

TABLE II

| | Flame spread*, inch | Smoke units* |
|---|---|---|
| 2 parts Thermoguard S ($Sb_2O_3$) | ¼ | 2,827 |
| 3 parts 80:20, $Sb_2O_3$:$Na_2B_4O_7$ | ½ | 2,423 |
| 4 parts 80:20, $Sb_2O_3$:$Na_2B_4O_7$ | ¼ | 2,553 |
| 5 parts 80:20, $Sb_2O_3$:$Na_2B_4O_7$ | ¼ | 2,078 |
| 6 parts 80:20, $Sb_2O_3$:$Na_2B_4O_7$ | ¼ | 2,145 |
| 3 parts Thermoguard S | 0 | 3,445 |

*Average of six determinations (all 24 mils thick).

As is readily apparent, significantly less smoke was obtained using the antimony glass composition of this invention, while the flame retardancy was approximately the same for all examples, although a larger portion of the antimony trioxide-sodium borate composition was used. However, as noted above, since the composition of this invention requires substantially less antimony trioxide weight for weight with the difference being made up by a substantially less expensive inorganic salt than the antimony trioxide, the cost of the use of the product herein, even in those cases where larger amounts are used, is substantially the same as or less than the prior art product while simultaneously achieving at least as good flame retardancy, and enhanced low smoke characteristics, and substantially reduced opacity of the final resin products.

Further, as illustrative of the enhanced results achieved in accordance herewith, one may note the comparative results of the tests noted below in which a standard antimony trioxide formulation was used in comparison with one of the preferred compositions of this invention, that is, antimony trioxide-sodium borate glass, in a plurality of polyvinyl chloride examples each containing the same ingredients and portions of ingredients, with some of the examples containing the flame retardant compositions in accordance herewith while others contained only the standard antimony trioxide.

More specifically, the specimens contained 100 parts (by weight) of Geon EP 101 (a polyvinyl chloride resin manufactured by B. F. Goodrich Co.), 44 parts di-octyl phthalate, 10 parts epoxidized soybean oil, 0.5 part stearic acid, and 2.5 parts of a barium-cadmium stabilizer. In addition, varying amounts (in parts by weight) of either antimony trioxide-sodium borate glass, or the standard antimony trioxide flame retardant were added to the individual specimens, with one having neither, as a control.

The results of the various examples may be noted in Table III below in which the specimens were rated both with reference to haze characteristics of the final products and by a yellowness index, and by the results noted in Table IV in which the heat stability was measured. The individual specimens were 3" x 9" sheets of polyvinyl chloride, 25 mils thick, and prepared substantially as the specimens for Table II noted above.

TABLE III

| Sample in parts by weight | Haze | Yellowness index |
|---|---|---|
| (1) No flame retardant | 1.4 | 25.3 |
| (2) 0.5 $Sb_2O_3$ | 31.9 | 46.1 |
| (3) 1.0 $Sb_2O_3$ | 44.8 | 53.6 |
| (4) 0.5 $Sb_2O_3Na_2B_4O_7$ | 6.6 | 34.6 |
| (5) 1.0 $Sb_2O_3Na_2B_4O_7$ | 12.9 | 43.4 |
| (6) 2.0 $Sb_2O_3Na_2B_3O_7$ | 22.3 | 54.8 |
| (7) 3.0 $Sb_2O_3Na_2B_4O_7$ | 32.2 | 66.1 |
| (8) 4.0 $Sb_2O_3Na_2B_4O_7$ | 35 | 72.2 |

TABLE IV

Heat Stability

The results of this test were measured in relationship to the following rating system:

Rating
9—Water white.
8—First color change.
7—Slightly yellow.
6—Yellow cast.
5—Yellow with orange or brown.
4—Brown.

| Sample | Initial rating | After 90 minutes at 176° C. |
|---|---|---|
| (1) No flame retardant | 9 | 6 |
| (2) 0.5 $Sb_2O_3Na_2B_4O_7$ | 8 | 6 |
| (3) 1.0 $Sb_2O_3Na_2B_4O_7$ | 8 | 5–6 |
| (4) 2.0 $Sb_2O_3Na_2B_4O_7$ | 8 | 5–6 |
| (5) 3.0 $Sb_2O_3Na_2B_4O_7$ | 7–8 | 5–6 |
| (6) 4.0 $Sb_2O_3Na_2B_4O_7$ | 7 | 5–6 |
| (7) 0,5 $Sb_2O_3$ | 7–8 | 5–6 |
| (8) 1.0 $Sb_2O_3$ | 7–8 | 5–6 |

From the above tables, it is readily apparent that the haze imparted to the specimens is no more using 3 parts by weight the antimony trioxide-sodium borate composition of this invention than it is using 0.5 part by weight of a standard antimony trioxide, and the yellowness imparted is only half as much as for standard flame retardants, or conversely, twice as much of the flame retardant of this invention may be used as the standard composition before the same degree of yellow cast results.

Referring to Table IV, it is obvious that heat stability is not adversely effected by the compositions of this invention with even a slightly enhanced effect in that when using the formulations of this invention slightly lighter shadings are achieved.

Further, whereas it has been found that the antimony trioxide-inorganic salt compositions, in accordance herewith, are not in themselves effective stabilizers for resins they do allow for a substantial decrease in the amount of such stabilizers up to about 60% which is most important when one realizes the well-known high cost of such stabilizers.

As further illustrative of the enhanced results achieved in accordance herewith, one may note the comparative results of the tests noted below in which a standard antimony trioxide formulation was used in comparison with one of the preferred compositions of this invention; that is, antimony trioxide-sodium aluminum fluoride glass in a plurality of polyvinyl chloride examples each containing the same ingredients and portions of ingredients, with some of the examples containing the flame retardant compositions in accordance herewith while others contained only the standard antimony trioxide.

More specifically, the specimens contained 100 parts (by weight) of Geon EP 101 (a polyvinyl chloride resin manufactured by B. F. Goodrich Co.), 41 parts dioctyl phthalate, 10 parts epoxidized soybean oil, 0.5 part stearic acid, and 2.5 parts of a barium-cadmium stabilizer, as well known. In addition, varying amounts (in parts by weight) of either antimony trioxide-sodium aluminum fluoride glass, or the standard antimony trioxide flame retardant were added to the individual specimens, with one having neither, as a control.

The results of the various examples may be noted in Table V below in which the specimens were rated both with reference to haze characteristics of the final products and by a yellowness index, and by the results of Table VI in which the heat stability was measured. The individual specimens or examples were 3" x 9" sheets of polyvinyl chloride 25 mils thick, and prepared substantially as the specimens in Table II noted above.

Further, a portion of the specimens designated (a) had the ratio of 95:5 $Sb_2O_3:Na_3AlF_6$ in a fused glass in accordance herewith; those designated (b) had the ratio of 90:10 $Sb_2O_3: Na_3AlF_6$ in a fused glass in accordance herewith; and those designated (c) had the ratio 90:10 $Sb_2O_3:Na_3AlF_6$ but without the mixture being fused.

TABLE V

| Sample | Haze |
|---|---|
| (1) No flame retardant | 1.73 |
| (2) (a) 0.5 part by weight | 7.1 |
| (3) (a) 1.0 part by weight | 13.0 |
| (4) (b) 0.5 part by weight | 7.1 |
| (5) (b) 1.0 part by weight | 11.1 |
| (6) (c) 0.5 part by weight | 25.8 |
| (7) (c) 1.0 part by weight | 39.2 |

TABLE VI

The results of this test were measured in relationship to the following rating system:

Rating
9—Water white.
8—First color change.
7—Slightly yellow.
6—Yellow cast.
5—Yellow with orange or brown.
4—Brown.

| Sample | Initial rating | After 90 min. at 350° C. |
|---|---|---|
| (1) No flame retardant | 8-9 | 6-7 |
| (2) (a) 0.5 part by weight | 8 | 5-6 |
| (3) (a) 1.0 part by weight | 6-7 | 5-6 |
| (4) (b) 0.5 part by weight | 7 | 5-6 |
| (5) (b) 1.0 part by weight | 6-7 | 5-6 |
| (6) (c) 0.5 part by weight | 8 | 5-6 |
| (7) (c) 1.0 part by weight | 8 | 5-6 |

From the above tables, it is readily apparent that the haze imparted to the specimens is strikingly reduced in those having incorporated therein the glass retardants in accordance herewith as opposed to those having a non-glass retardant. Further, there is no substantial deleterious effect in yellowness when flame retardants in accordance herewith are introduced as compared, for example, to the control sample having no flame retardant.

Table VII shows the effect of flame spread tests of a portion of the specimens of Tables V and VI and indicates the enhanced results achieved.

TABLE VII

| Sample | Flame spread (in inches) |
|---|---|
| 1. (a) 0.5 part by weight | 0.87 |
| 2. (a) 1.0 part by weight | 0.076 |
| 3. (b) 0.5 part by weight | 0.60 |
| 4. (b) 1.0 part by weight | 0.076 |
| 5. (c) 0.5 part by weight | 0.63 |
| 6. (c) 1.0 part by weight | 0.18 |

As purely illustrative of the results achieved in accordance herewith utilizing polypropylene and the preferred flame retardant composition in accordance herewith of 80 parts antimony trioxide and 20 parts sodium borate in order to evaluate the flame retardant properties thereof, one may note the results listed in Table VIII wherein the results of a variety of formulations are listed using Profax 6501 (a brand of polypropylene resin manufactured by Hercules Company), and three chlorine sources including Chlorowax 70 (a chlorinated paraffin containing 70% chlorine and manufactured by Diamond Chemical Co.), Dechlorane (a brand of perchloropentacyclodecane $$(C_{10}Cl_{12})$$

having a melting point of 485° C. and manufactured by Hooker Chemical Co.), and Dechlorane + (a brand of perchloropentacyclodecane containing a melting point depressant and with a melting point of 350° C. and manufactured by Hooker Chemical Co.).

TABLE VIII.—EFFECT OF LOADING ON FLAMMABILITY AND PHYSICAL PROPERTIES IN POLYPROPYLENE

| | 1 | 2 | 3 | 4 | 5 | 6 | 7 |
|---|---|---|---|---|---|---|---|
| Profax 6501 | 100 | 100 | 100 | 100 | 100 | 100 | 100 |
| Chlorowax 70 | | 20 | | 20 | | | |
| Dechlorane | | | 30 | 10 | | | |
| Dechlorane (+) | | | | | 20 | | |
| Thermoguard S | | 10 | | | 10 | 15 | |
| 80:20 (−325) | | | 15 | 15 | | | 15 |
| Physical properties: | | | | | | | |
| Tensile strength | 5,250 | 4,945 | 4,520 | 4,690 | 4,515 | 5,390 | 5,320 |
| Percent elongation | 75 | 20 | 54 | 60 | 14 | 115 | 74 |
| Izod impact | .243 | .137 | .389 | .212 | .411 | .447 | .368 |
| Burning properties: | | | | | | | |
| Burning time (sec.) | | 97 | 190 | 165 | 198 | | |
| Burning length (in.) | 4 | 2.17 | 2.2 | 2.2 | 2.3 | 4 | 4 |
| Ignitions | 1 | 2 | 2 | 2 | 2 | 1 | 1 |
| Self-extinguishing | No | Yes | Yes | Yes | Yes | No | No |

*No break.

The results in Table VIII indicate that the physical properties obviously are not detrimentally affected by the addition of the particular preferred composition noted herein while at the same time achieving the desired substantial decrease in the opaque characteristics of the polypropylene resin product. Even in those cases where larger amounts of the composition, in accordance herewith, were used the amount of the more expensive antimony trioxide was less.

As purely illustrative of the results achieved in accordance herewith utilizing polyethylene and the preferred flame retardant composition in accordance herewith of 80 parts antimony trioxide and 20 parts sodium borate in order to evaluate the flame retardant properties thereof, one may note the results listed in Table IX wherein the results of a variety of formulations are listed using various polyethylene formulations, and including MN 704 (a polyethylene having a density of 0.918 and a melt index of 12 and being a brand of polyethylene manufactured by U.S.I. Microthenes), ML 708 (a brand of polyethylene manufactured by U.S.I. Microthenes and having a density of 0.950 and a melt index of 5), and ML 733X (a brand of polyethylene manufactured by U.S.I. Microthenes and having a density of 0.960 and a melt index of 5), and several of the same chlorine source products as noted in Table VIII above.

TABLE IX.—EFFECT OF LOADING ON FLAMMABILITY AND PHYSICAL PROPERTIES IN POLYETHYLENE

| | 1 | 2 | 3 | 4 | 5 | 6 | 7 | 8 | 9 |
|---|---|---|---|---|---|---|---|---|---|
| MN 704 | 100 | | | | 100 | 100 | 100 | | |
| ML 708 | | 100 | | 100 | | | | 100 | |
| ML 733X | | | 100 | | | | | | 100 |
| Chlorowax | 25 | 25 | 25 | 25 | | | | | |
| Dechlorane (+) | | | | | 25 | 25 | | | |
| Thermoguard S | | | | | 10 | | 10 | | |
| 80:20 (−325) | 10 | 10 | 10 | | 10 | | | | |
| Physical properties: | | | | | | | | | |
| Tensile strength | 1,178 | 3,145 | 3,800 | 3,500 | 993 | 1,129 | 1,190 | 3,080 | 3,700 |
| Percent elongation | 160 | 40 | 30 | 35 | 140 | 125 | 280 | 860 | 955 |
| Izod impact | *NB | .333 | .149 | .365 | *NB | *NB | *NB | 1.035 | *NB |
| Burning properties: | | | | | | | | | |
| Burning time (sec.) | 164 | 187 | 197 | 177 | 174 | 170 | | | |
| Burning length (in.) | 2.35 | 2.60 | 2.45 | 2.15 | 2.05 | 2.1 | 4 | 4 | 4 |
| Ignition | 2 | 2 | 2 | 2 | 2 | 2 | 1 | 1 | 1 |
| Self-extinguishing | Yes | Yes | Yes | Yes | Yes | Yes | No | No | No |

*No break.

Table IX indicates that the preferred flame retardant product of this invention gave properties comparable to the standard Thermoguard S antimony trioxide flame retardant. However, the physical properties obviously are not detrimentally effected by the addition of the particular preferred composition noted herein while at the same time achieving the desired substantial increase in the opaque characteristics of the polyethylene resin product.

Further, as illustrative of the enhanced results achieved in accordance herewith in which synthetic fibers have incorporated therein various amounts of the antimony trioxide-inorganic salt compositions, one may note the results of tests on a specific polyethylene terephthalate, which formulation included 20 parts (by weight) polyethylene terephthalate, 2 parts Dechlorane (a brand of perchloropentacyclodecane ($C_{10}Cl_{12}$), having a melting point of 485° C. and manufactured by Hooker Chemical Co.) and 1 part of the preferred antimony trioxide-sodium borate glass in the ratio of 80:20.

The above formulation was heated to 280° C. and the resulting fluid mass was drawn into fibers by hand. In testing the flame retardancy characteristics of the fibers obtained, a standard puddle test was used, as well known, in which 0.5 gram of the fibers were placed in an aluminum dish and impinged with a butane flame for 10 seconds. There was instantaneous flame-out of the polyethylene terephthalate (PET) fiber incorporating the flame retarding compositions of this invention, while a standard PET fiber undergoing the same test did not flame out in 8 seconds.

In a second test utilizing the same formulations as above only substituting for the 20 parts PET, 20 parts of MN 704 (a polyethylene (PE) having a density of 0.918 and a melt index of 12 and being a brand of polyethylene manufactured by U.S.I. Microthenes). The formulation was heated to 280° C. and drawn into fibers by hand. The same puddle test was performed as above with the standard PE exhibiting a flame out in 11 seconds, whereas the PE formulation containing the flame retardant of this invention flamed out in 2 seconds.

In order to compare the results achieved by the utilization of the particular flame retardant composition as taught herein with standard flame retardant compositions such as the Thermoguard S product noted above, various examples were made of both polyethylene resins and polypropylene resins with a portion of samples containing a standard antimony trioxide flame retardant, and with part of the samples containing the preferred antimony trioxide-sodium borate glass composition of this invention. In addition, various of the samples contained color pigment rather than being colorless and clear, while some of the other samples were clear product containing no color pigment. It is readily apparent from a casual observation of the clear samples which were mounted on black electrical tape in order to show how clear the tape was visible through the various samples that the polyethylene resin, for example, which contained the standard Thermoguard S antimony trioxide flame retardant almost completely covered the black electrical tape so as to make it almost non-visible through the polyethylene samples. Contrasting this, the sample containing the product of this invention when placed upon the strip of black electrical tape clearly showed the black electrical tape through the sample.

With those samples containing color pigment, the differences between the control samples and those containing the product of this invention were readily apparent. For example, the control examples containing a standard antimony trioxide flame retardant, and containing red pigment, had a pastel shade effect given to the color pigment therein simply because of the increased opacity imparted into the polypropylene samples which effectively blocked or shaded a portion of or all of the pigment contained therein and/or actual interaction between the antimony trioxide and the pigment. By contrast, the samples containing the product of this invention maintained their vivid color with little or no interference between the pigment in the samples and the outer surface of the sample.

As further exemplary of the enhanced results achieved in accordance herewith, a plurality of polyvinyl chloride samples were prepared using the standard formulation noted above. Part of the samples were prepared as control examples in which no flame retardant was included in the specimens. Another portion of the specimens contained a standard antimony trioxide flame retardant, and being four parts of Thermoguard L, a product of M&T Chemicals Inc., and containing 99.5% antimony trioxide, with the individual particles thereof being substantially within the range of 2.5 microns. A still further portion of the polyvinyl chloride specimens contained 9 parts of the preferred flame retardant composition, in accordance herewith, of an antimony trioxide:sodium borate glass composition in a ratio of 80:20. In addition, all three of the formulations noted above had portions in which pigment was also introduced into the formulation, while other specimens contained no pigment.

The specimens containing the standard antimony trioxide flame retardant had imparted thereto an obviously increased opacity to the point where the specimens having no pigment therein when placed over a black adhesive tape allowed almost none of the black of the tape to show through. Further, those portions of the specimens containing the standard flame retardant composition and having pigment imparted into the formulation thereof had an obvious color variation from the control sample containing no flame retardant, and to the point where the actual color appeared different, and being what would be described as a pastel as opposed to the much more vivid color showing in the control examples.

By contrast, the specimens having imparted into them a flame retardant composition in accordance herewith appear to have little or no difference in appearance from the control example. For example, in those where no pigment was included, the specimens placed over a black adhesive tape allowed the tape to show through almost to the same extent as the clear control sample, thus indicating that the flame retardant compositions in accordance herewith impart very little increased opacity to clear resin. In addition, those samples having pigment included appear to have no variation in color from the control samples thus indicating that the compositions in accordance herewith are much more effective for maintaining true color veracity in polyvinyl formulations.

Accordingly, and as will be apparent from the foregoing, there are provided in accordance herewith, methods and compositions for imparting flame retardancy and low smoke characteristics to a wide variety of resin compositions while simultaneously maintaining a level of opacity to such compositions substantially within the same range as they would be without any flame retardant composition incorporated therein by formulating a flame retardant fused glass composition having a refractive index substantially within the same range of the resin into which it is to be incorporated, thus improving the final resin product to the extent where if clear resin products are desired there is no obvious reduction in the transparency thereof, and if colored vinyl resin products are desired there is substantially no interference with the true color desired and no variation in color between batches of the final product. Further, because of the large range of operability of the ranges of antimony trioxide-inorganic salt compositions in accordance herewith, a wide range of resin compositions can be usefully flame retarded herein for making a wide range of commercial products having different characteristics as desired, with the compositions, in accordance herewith, being substantially within the same range of cost of less than previous compositions taught in the art, thus making the compositions and the formulations in accordance herewith largely advantageous commercially.

While the methods and compositions herein disclosed form preferred embodiments of this invention, this invention is not limited to those specific methods and composi-

What is claimed is:

1. In a method for producing a composition for enhancing the flame retardant-low smoke characteristics of resins substantially in the absence of an increase in the opacity of said resins, the steps which comprise admixing ingredients consisting essentially of antimony trioxide and an inorganic compound selected from the group consisting or sodium borate, lithium borate, zinc borate, ammonium borate, potassium orthophosphite, sodium phosphate, sodium fluorophosphate, lead oxide, sodium aluminate, sodium aluminum fluoride, boric anhydride, phosphorous pentoxide, sodium pyrophosphate, barium oxide, sodium carbonate, cobaltous carbonate, calcium oxide, magnesium oxide, sodium antimonate, and mixtures thereof in the ratio of 10:90 to 99:1 parts by weight antimony trioxide to inorganic compound, heating said admixture to a temperature sufficient to fuse the components thereof, pouring said fused components onto a cold metallic plate for cooling said components to form a glass, and reducing said glass into particulate form.

2. A method as described in claim 1 in which the temperature of said heating step is within the range of 650° C. to 1100° C.

3. A method as described in claim 1 in which the temperature of said heating step is 1000° C.

4. A method as described in claim 1 in which said reducing step includes reducing said glass to a particle size of below about 60 microns.

5. A method as described in claim 4 in which said glass is reduced to a particle size of between less than 1 to 5 microns.

6. A method as described in claim 1 in which said ratio of antimony trioxide to inorganic compound is within the range of about 80:20 parts by weight.

7. A method as described in claim 1 in which said inorganic compound is sodium borate.

8. A method as described in claim 7 in which said ratio of antimony trioxide to sodium borate is within the range of about 80:20 parts by weight.

9. A method as described in claim 8 in which the temperature of said heating step is about 1000° C.

10. A method as described in claim 9 in which said reducing step includes reducing said glass to a particle size of below about 60 microns.

11. A method as described in claim 1 in which said inorganic compound is sodium aluminum fluoride.

12. A method for reducing the refractive index of an antimony trioxide flame retardant, the steps which comprise admixing ingredients consisting essentially of antimony trioxide and an inoragnic salt selected from the group consisting of sodium borate and sodium aluminum fluoride in a ratio of 80:20 parts by weight, heating said admixture to a temperature of 1000° C. to fuse the components of said admixture, pouring said fused components onto a cold steel plate, cooling said fused components to ambient to form glass, and reducing said glass to particle size within the range of below about 60 microns.

13. A flame retardant-low smoke composition for use in a variety of resin compositions and consisting essentially of a fused mixture of antimony trioxide and an inorganic compound selected from the group consisting of sodium borate, lithium borate, zinc borate, ammonium borate, potassium orthophosphite, sodium phosphate, sodium fluorophosphate, lead oxide, sodium aluminate, sodium aluminum fluoride, boric anhydride, phosphorous pentoxide, sodium pyrophosphate, barium oxide, sodium carbonate, cobaltous carbonate, calcium oxide, magnesium oxide, sodium antimonate, and mixtures thereof in the ratio of about 10:90 to 99:1 parts by weight of animony trioxide to inorganic compound, with said fused mixture. being in particulate form with the individual particles thereof being substantially within the range of below about 60 microns.

14. A composition as described in claim 13 in which the particle range is between less than 1 to 5 microns.

15. A flame retardant-low smoke composition as described in claim 13 in which the ratio of said antimony trioxide to said inorganic compound is between about 80:20 parts by weight.

16. A flame retardant-low smoke composition as recited in claim 15 in which said inorganic compound is sodium borate.

17. A flame retardant-low smoke composition as recited in claim 15 in which said inorganic compound is sodium aluminum fluoride.

18. A resin compositon possessing enhanced flame retardant-low smoke characteristics consisting essentially of the said resin having disposed therein a flame retarding amount of a glass consisting essentially of a mixture of antimony trioxide and an inorganic compound selected from the group consisting of sodium borate, lithium borate, zinc borate, ammonium borate, potassium orthophosphite, sodium phosphate, sodium fluorophosphate, lead oxide, sodium aluminate, sodium aluminum fluoride, boric anhydride, phosphorous pentoxide, sodium pyrophosphate, barium oxide, sodium carbonate, cobaltous carbonate, calcium oxide, magnesium oxide, sodium antimonate and mixtures thereof, with the ratio of antimony trioxide-inorganic compound being between about 10:90 to 99:1 parts by weight, and with said antimony trioxide-inoragnic compound glass being in particulate form with the individual particles thereof being substantially within the range of below about 60 microns.

19. A composition as described in claim 18 in which the ratio of said antimony trioxide to said inorganic compound is between about 80:20 parts by weight.

20. A composition as described in claim 18 in which said inorgaic compound is sodium borate.

21. A composition as described in claim 20 in which said ratio of antimony trioxide to sodium borate is between about 80:20 parts by weight.

22. A compostion as described in claim 18 in which said inorganic compound is sodium aluminum fluoride.

23. A composition as described in claim 18 in which said resin is selected from the group consisting of halogenated polyolefins, polyesters, plastisols, halogenated polymers, polymers in combination with a halogen source and copolymers containing said polymers.

24. A composition as described in claim 18 in which said resin is polyvinyl chloride and copolymers thereof.

25. A composition as described in claim 18 in which said resin is polyethylene.

26. A composition as described in claim 18 in which said resin is polyproplene.

27. In a method for producing a resin composition having enhanced flame retardant-low smoke characteristics substantially in the absence of an increase in opacity thereof, the steps which comprise admixing with said resin a flame retarding amount of a composition comprising a glass consisting essentially of antimony trioxide and an inorganic compound selected from the group consisting of sodium borate, lithium borate, zinc borate, ammonium borate, potassium orthophosphate, sodium phosphate, sodium fluorophosphate, lead oxide, sodium aluminate, sodium aluminum fluoride, boric anhydride, phosphorous pentoxide, sodium pyrophosphate, barium oxide, sodium carbonate, cobaltous carbonate, calcium oxide, magnesium oxide, sodium antimonate and mixtures thereof in the ratio of between about 10:90 to 99:1 parts by weight of antimony trioxide to inorganic compound with said glass composition being in particulate form and with the individual particles thereof being of a size within the range of below about 60 microns, and forming said admixing ingredients into said resin composition.

28. A method as described in claim 27 in which said particle size is within the range of between less than 1 to 5 microns.

29. A method as described in claim 27 in which said antimony trioxide-inorganic compound glass particulate composition is between less than 1 to 25 parts by weight of said resin.

30. A method as described in claim 27 in which said inorganic compound is sodium borate.

31. A method as described in claim 30 in which the ratio of antimony trioxide to sodium borate is 80:20 parts by weight.

32. A method as described in claim 27 in which said inorganic compound is sodium aluminum fluoride.

33. A method as described in claim 27 in which said resin is selected from the group consisting of halogenated polyolefins, polyolefins in combination with a halogen source, plastisols, other halogenated polymers and polymers in combination with a halogen source, and copolymers containing said polymers.

34. A method as described in claim 27 in which said resin is polypropylene.

35. A method as described in claim 27 in which said resin is polyethylene.

36. A method as described in claim 27 in which said resin is polyvinyl chloride.

37. A method as described in claim 27 in which said polyvinyl chloride is present in the amount of about 100 parts by weight of said admixture.

38. A method as described in claim 37 in which said admixing step also includes incorporating into said admixture an effective amount of di-octyl phthalate, stearic acid, and a heat stabilizer.

39. In a method for producing a resin composition having enhanced flame retardant-low smoke characteristics substantially in the absence of an increase in opacity thereof, the steps which comprise predetermining the refractive index of said resin, admixing with said resin a flame retarding amount of a composition having substantially the same refractive index as said resin, said composition comprising a glass consisting essentially of antimony trioxide and an inorganic compound selected from the group consisting of sodium borate, lithium borate, zinc borate, ammonium borate, potassium orthophosphate, sodium phosphate, sodium fluorophosphate, lead oxide, sodium aluminate, sodium aluminum fluoride, boric anhydride, phosphorous pentoxide, sodium pyrophosphate, barium oxide, sodium carbonate, cobaltous carbonate, calcium oxide, magnesium oxide, sodium antimonate and mixtures thereof in the ratio of between about 10:90 to 99:1 parts by weight of antimony trioxide to inorganic compound, the particular amounts of said antimony trioxide and inorganic compound being selected within said range in accordance with the results of said predetermination step, with said glass composition being in particulate form and with the individual particles thereof being of a size within the range of 60 microns or less, and forming said ingredients into said resin composition.

40. A method as described in claim 39 in which said particle size is within the range of between less than 1 to 5 microns.

41. A method as described in claim 39 in which said inorganic compound is sodium borate.

42. A method as described in claim 39 in which said inorganic compound is sodium aluminum fluoride.

43. A method as described in claim 41 in which said ratio of antimony trioxide to sodium borate is 80:20 parts by weight.

44. A method as described in claim 42 in which said ratio of antimony trioxide to sodium aluminum fluoride is 80:20 parts by weight.

45. A method as described in claim 39 in which said resin is selected from the group consisting of polyethylene, polypropylene and polyesters in combination with a halogen source; plastisols, and polyvinyl chloride and copolymers thereof.

References Cited

UNITED STATES PATENTS

| | | | |
|---|---|---|---|
| 2,420,644 | 5/1947 | Athy et al. | 117—138 |
| 3,333,970 | 8/1967 | Green | 106—15 |

JOHN T. GOOLKASIAN, Primary Examiner

D. J. FRITSCH, Assistant Examiner

U.S. Cl. X.R.

106—15, 292, 296, 297, 303; 260—28.5, 40, 41, 45.7; 252—8.1